(12) United States Patent
Peterson

(10) Patent No.: US 7,673,160 B2
(45) Date of Patent: Mar. 2, 2010

(54) SYSTEM AND METHOD OF POWER MANAGEMENT FOR COMPUTER PROCESSOR SYSTEMS

(75) Inventor: Milford J. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 11/551,007

(22) Filed: Oct. 19, 2006

(65) Prior Publication Data

US 2008/0098242 A1 Apr. 24, 2008

(51) Int. Cl.
*G06F 1/32* (2006.01)
(52) U.S. Cl. .................. 713/320; 713/340; 712/229
(58) Field of Classification Search .......... 713/300, 713/320, 340; 712/200, 229
See application file for complete search history.

(56) References Cited

U.S. PATENT DOCUMENTS 6,055,640 A * 4/2000 Kageshima et al. ......... 713/320
6,513,124 B1 * 1/2003 Furuichi et al. ............ 713/322
6,826,705 B2 * 11/2004 Tani ......................... 713/320
7,340,628 B2 * 3/2008 Pessolano .................. 713/340
2004/0221185 A1 11/2004 Bose et al.
2006/0259823 A1 * 11/2006 Sohm et al. ................. 714/38

FOREIGN PATENT DOCUMENTS

WO  WO 2004/086205  10/2004

\* cited by examiner

*Primary Examiner*—Thuan N Du
(74) *Attorney, Agent, or Firm*—VanLeeuwen & VanLeeuwen; Diana Roberts Gerhardt

(57) ABSTRACT

A system and method of power management for computer processor systems, the method including measuring power usage; monitoring execution of instructions for a finishing instruction; determining a finishing instruction address for the finishing instruction; determining measured power usage for the finishing instruction; and storing the finishing instruction address in association with the measured power usage in a Power History Table (PHT). The information stored in the PHT can be employed to manage the power used by the computer processor system.

17 Claims, 4 Drawing Sheets

SYSTEM AND METHOD OF POWER MANAGEMENT FOR COMPUTER PROCESSOR SYSTEMS

TECHNICAL FIELD

The technical field of this disclosure is computer processor systems, particularly, power management for computer processor systems.

BACKGROUND OF THE INVENTION

Computer processor systems continue to get faster and the density of components continues to increase. This presents problems in power management for the computer processor systems, in both peak power and average power usage. High peak power usage requires larger power supplies and can increase noise in the digital circuits. For example, simultaneous component switching can cause high peak power usage, which can cause power/ground bounce. The power/ground bounce, due to intrinsic inductance and capacitance in leads and components, results in noise on the power or ground busses, respectively, and causes logic errors. High average power usage increases power costs and generates heat, which can reduce operational reliability.

Present solutions to power management have a significant detrimental effect on computer processor system performance. One solution is to run the computer processor system slower, which increases computing time. Another solution is to perform fewer speculative operations, i.e., reduce the number of operations that are performed before it is known that the results of those operations will be needed. Another solution is to perform fewer operations in parallel (at the same time). Other solutions include down sizing transistors, which makes them slower and reduces noise margin, and increasing oxide layer thickness, which also reduces transistor speed. The present solutions to power management substantially impair operation of the computer processor system.

It would be desirable to have a system and method of power management for computer processor systems that would overcome the above disadvantages.

SUMMARY OF THE INVENTION

The system and method of power management for computer processor systems of the present invention provides a power history table (PHT) storing measured power usage for an associated address for an instruction. The measured power usage is determined during operation of the computer processor system. The computer processor system can manage the power use based on previously measured power usage when an instruction having the associated address runs. This allows the computer processor system to adjust for instructions requiring high power while minimizing the negative impact to overall performance.

One aspect of the present invention provides a method of power management for a computer processor system, including measuring power usage; monitoring execution of instructions for a finishing instruction; determining a finishing instruction address for the finishing instruction; determining measured power usage for the finishing instruction; and storing the finishing instruction address in association with the measured power usage in a Power History Table (PHT).

Another aspect of the present invention provides computer program product in a computer usable medium for power management for a computer processor system, including computer program code for measuring power usage; computer program code for monitoring execution of instructions for a finishing instruction; computer program code for determining a finishing instruction address for the finishing instruction; computer program code for determining measured power usage for the finishing instruction; and computer program code for storing the finishing instruction address in association with the measured power usage in a Power History Table (PHT).

Another aspect of the present invention provides an information handling system, including a processor; a memory coupled to said processor to store instructions executable by a digital processing apparatus to perform operations to provide power management for a computer processor system. The operations include measuring power usage; monitoring execution of instructions for a finishing instruction; determining a finishing instruction address for the finishing instruction; determining measured power usage for the finishing instruction; and storing the finishing instruction address in association with the measured power usage in a Power History Table (PHT).

Another aspect of the present invention provides a computer processor system with power management including an instruction fetch control unit, the instruction fetch control unit having a power history table (PHT); an instruction dispatch control unit; an instruction execution unit, the instruction execution unit having a power control unit; and a program state and data unit. The instruction dispatch control unit dispatches an instruction from the instruction fetch control unit to the instruction execution unit for execution, the power control unit monitors the execution of the instruction for measured power usage, and the program state and data unit monitors the execution of the instruction for a finishing instruction address, the measured power usage being stored in the power history table (PHT) in association with the finishing instruction address.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF PREFERRED EMBODIMENTS

Figure 1:
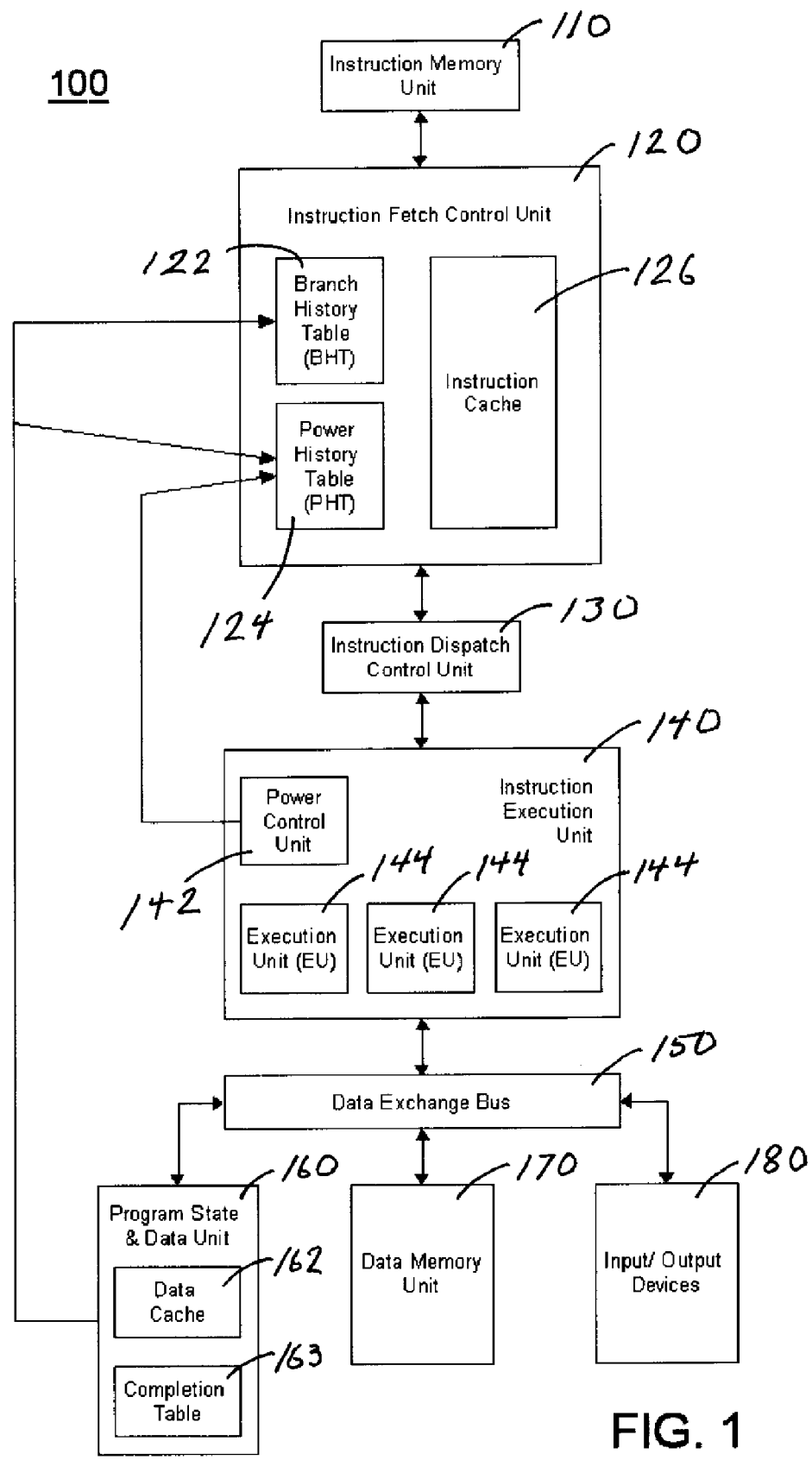
FIG. 1 is a block diagram of a computer processor system for use with the present invention.

FIG. 1 is a block diagram of a computer processor system for use with the present invention. A computer processor system 100 includes an instruction memory unit 110, an instruction fetch control unit 120, an instruction dispatch control unit 130, an instruction execution unit 140, a data exchange bus 150, a program state and data unit 160, a data memory unit 170, and input/output devices 180. A power history table (PHT) in the instruction fetch control unit 120 stores measured power usage history for instructions by address so that the computer processor system 100 can adapt power use for particular instructions.

The instruction fetch control unit 120 fetches instructions stored in the instruction memory unit 110 and provides the instructions to the instruction dispatch control unit 130. The instruction dispatch control unit 130 controls the flow of instructions under the direction of the instruction fetch control unit 120. The instruction execution unit 140 executes the instructions and operates on data. The instruction execution unit 140 also measures power usage and provides that information to the PHT 124. The program state and data unit 160 tracks instruction execution and provides that information to the PHT 124.

The instruction fetch control unit 120 fetches instructions stored in the instruction memory unit 110 and provides the instructions to the instruction dispatch control unit 130. In one embodiment, the instructions are fetched one at a time. In another embodiment, the instructions are fetched as a group, such as an exemplary group of five instructions. The instruction fetch control unit 120 includes a branch history table (BHT) 122, a power history table (PHT) 124, and an instruction cache 126. The BHT 122 and the PHT 124 store history of branching and power, respectively, for instructions by finishing instruction address. The instruction cache 126 holds single instructions or groups of instructions called from the instruction memory unit 110 until they are transferred out of the instruction memory unit 110 under the direction of the instruction dispatch control unit 130. In one embodiment, the BHT 122 and the PHT 124 are separate tables. In another embodiment, the BHT 122 and the PHT 124 are combined as a single table. Typically, the BHT 122 and the PHT 124 have the same number of addresses. Those skilled in the art will appreciate that the number of addresses used in the BHT 122 and the PHT 124 depends on the particular application, an exemplary range being from 64 to 2,000 addresses. The addresses can be stored as partial or truncated addresses to save space in the BHT 122 and/or the PHT 124. The branching and power history can be held in a completion table 163 in the program state and data unit 160 after an instruction has been completed, so that the branching and power history can be sent to the BHT 122 and/or the PHT 124, respectively.

The BHT 122 is a table of branch history values indexed for instructions by finishing instruction address. The branch history values can be determined during operation of the computer processor system 100, with the program state and data unit 160 providing the branch taken or not taken by the instruction at a particular address to the BHT 122 for storage. For example, an instruction with Address #10 may follow Branch B once and Branch A the next four times. The branch followed is provided to the BHT 122 by the program state and data unit 160 each time the instruction with Address #10 runs. Based on the history, an instruction with Address #10 follows Branch A eighty percent of the time and Branch B twenty percent of the time. The likelihood of following Branch A can be stored in the BHT 122 as high and the likelihood of following Branch B can be stored in the BHT 122 as low. When the instruction with Address #10 is called for future runs, the instruction fetch control unit 120 can query the BHT 122 for the likely branch to be followed and begin speculative execution along the likely branch. In this exemplary case, speculative execution can begin along Branch A, since it is a more likely branch than Branch B. Thus, the speculative execution can proceed ahead of the actual execution to save processing time. When the likely branch is not the branch followed, the results of the speculative execution can be discarded.

The PHT 124 is a table of measured power usage values indexed for instructions by finishing instruction address. The measured power usage values can be determined during operation of the computer processor system 100 and stored in the PHT 124, with the program state and data unit 160 providing the instruction at a particular address and a power control unit 142 in the instruction execution unit 140 providing the measured power usage. For example, an instruction with Address #10 may be finishing and the power control unit 142 detects the finishing and provides the Address #10 to the PHT 124. The power control unit 142 provides the measured power usage measured while the instruction with Address #10 was running, such as high, medium, low, or the like, to the PHT 124. The power usage can be stored for Address #10 in the PHT 124. When the instruction with Address #10 is called for future execution, the instruction fetch control unit 120 can query the PHT 124 for the measured power usage and appropriately manage power usage for the computer processor system 100, such as directing the instruction dispatch control unit 130 how to dispatch the instructions.

An address portion of the PHT 124 stores the addresses for the instructions and a power usage portion stores the measured power usage for the particular address. In one embodiment, the power usage portion is a single bit wide and the measured power usage is stored as high or low. In another embodiment, the power usage portion is two bits wide and the measured power usage can be stored as high, medium, low, or unknown. In other embodiments, the power usage portion can be more than two bits wide and finer increments of measured power usage can be stored. In one embodiment, the PHT 124 and the BHT 122 are combined in a single table, so that the addresses only need to be stored in a single column for both. Those skilled in the art will appreciate that the PHT 124 can be sized as desired for a particular application.

The instruction cache 126 holds instructions or groups of instructions received at the instruction fetch control unit 120 from the instruction memory unit 110 and provided to the instruction dispatch control unit 130. The instruction dispatch control unit 130 can control the flow of the instructions or groups of instructions from the instruction cache 126 under direction of the instruction fetch control unit 120, which can control the flow for execution and/or power management.

The instruction execution unit 140 includes the power control unit 142 and execution units (EUs) 144. The instruction execution unit 140 receives instructions from the instruction dispatch control unit 130, receives data from the data exchange bus 150, executes the instructions in the EUs 144, and returns data to the data exchange bus 150. One or more of the EUs 144 can be shut down under the direction of the power control unit 142 to reduce power usage when the EUs 144 are not needed for the present instruction execution. The power control unit 142 measures the power usage and provides the measured power usage to the PHT 124.

The data exchange bus 150 passes data among instruction execution unit 140, the program state and data unit 160, the data memory unit 170, and the input/output devices 180. The data memory unit 170 stores data and the input/output devices 180 allow input and output of data and instructions to the computer processor system 100. The program state and data unit 160 includes a data cache 162, which temporarily caches data to between the instruction execution unit 140 and the data memory unit 170. The program state and data unit 160 tracks the finishing instructions and provides the finishing instruction addresses to the PHT 124. The program state and data unit 160 also tracks the running instructions and branch history using the completion table 163, and provides them to the BHT 122.

Those skilled in the art will appreciate that the computer processor system 100 illustrated is but one example and that other configurations are possible. For example, the program state and data unit 160 can be located elsewhere in the computer processor system 100 and is not limited to connection to the data exchange bus 150.

Figure 2:
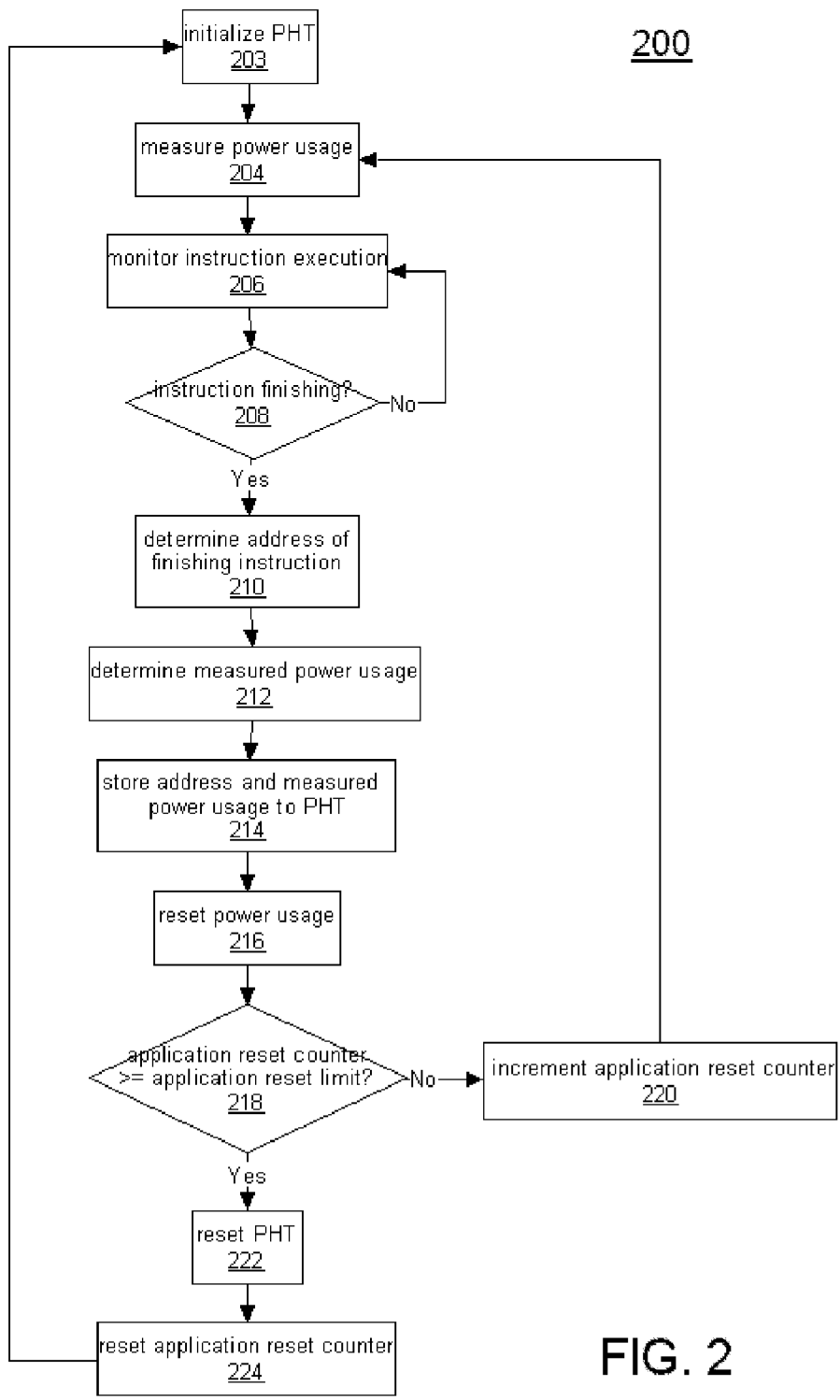
FIG. 2 is a flow chart of power history table management for a method of power management performed in accordance with the present invention.

FIG. 2 is a flow chart of power history table management for a method of power management performed in accordance with the present invention. The power history table management method 200 populates the power history table (PHT) with measured power usage values that can be used to manage power for computer processor systems.

The method 200 starts with initializing the PHT 203. Power usage in the computer processor system is measured 204. Execution of instructions is monitored for a finishing instruction 206 and it is determined whether an instruction is finishing 208. When no instruction is finishing, the method 200 continues with monitoring instruction execution 206. When an instruction is finishing, the address of the finishing instruction is determined for the finishing instruction 210 and the measured power usage is determined for the finishing instruction 212. The finishing instruction address and the measured power usage are stored to the PHT in association with each other 214. The power usage is reset 216 to allow tracking of power usage for the next instruction which executes. In one embodiment, the method 200 can continue with initializing the PHT 203. In another embodiment, the method 200 can continue with measuring power usage 204.

The method 200 can also include an optional reset routine as illustrated in FIG. 2. The optional reset routine accounts for different computer applications using different addresses differently over time. For example, one application, such as a spreadsheet, may use low power for a given address, while another program running later may use high power. Resetting the PHT after a predetermined number of operations or amount of time allows the PHT to account for the different power usage with the different applications.

The optional reset routine determines whether an application reset counter is greater than or equal to an application reset limit defining a predetermined interval 218. When the application reset counter is greater than or equal to an application reset limit, the application reset counter is incremented 220 and the method 200 continues with measuring power usage 204. When the application reset counter is not greater than or equal to an application reset limit, the PHT is reset 222 and the application reset counter is reset 224. In one embodiment, the method 200 can continue with initializing the PHT 203. In another embodiment, the method 200 can continue with measuring power usage 204. Those skilled in the art will appreciate that the value for the application reset limit can be selected as desired for a particular application. In one example, the application reset limit is one million.

The PHT is initialized 203 to set the values for the measured power usage in the PHT to a predetermined power usage value. Typically, the measured power usage values are initialized to a low or an unknown value. In one example, when the power usage portion of the PHT is a single bit wide and the measured power usage is stored as high or low, the predetermined power usage value is low. In another example, when the power usage portion of the PHT is two bits wide and the measured power usage can be stored as high, medium, low, or unknown, the predetermined power usage value is unknown. The measured power usage can then increase to a higher value if warranted by the power usage measured during execution of the associated instruction.

In measuring the power usage in the computer processor system 204, the measuring technique can be selected to give the best results for the particular computer processor system design. In one embodiment, execution units (EUs) that are not required for execution of a particular instruction are shut down while the particular instruction is executed. In one example, each EU can be considered a clock gated region of an integrated circuit. To measure the power usage, a clock can be associated with each EU and each clock can run when the associated EU is turned on to track the on-time for each execution unit. When an instruction finishes, the on-times for all the clocks can be summed to determine the measured power usage. A more precise power usage measurement can be obtained by accounting for the relative areas of the EUs. When an instruction finishes, the on-times for all the clocks can be summed with weighting by the fractional area of each EU to determine the measured power usage. For example, an EU that is one half of the total area of all the EUs would be weighted twice as heavily as an EU that is one quarter of the total area of all the EUs. The weighting by the fractional area allows for power usage being proportional to the area of the EU. Those skilled in the art will appreciate that a single EU can be broken up into several or many clock gated regions and each of these clock gated regions counts towards the power usage measurement. In another embodiment, the measuring the power usage in the computer processor system 204 includes measuring the temperature of a power rail as an indication of power usage.

The address of the finishing instruction and the measured power usage are stored to the PHT 214, i.e., the finishing instruction address is stored in association with the measured power usage. The addresses can be stored as partial or truncated addresses to save space in the PHT. In one embodiment, the most recent measured power usage determined for an instruction is stored to the PHT, so that the stored value is always the most recent value. In another embodiment, the highest measured power usage determined for an instruction is stored to the PHT, so that the stored value is the largest measured value. A newly determined measured power usage is compared to the presently stored measured power usage and the newly determined measured power usage is only stored in the PHT when the newly determined measured power usage is greater than the presently stored measured power usage. For example, when the presently stored measured power usage is low, the newly determined measured power usage is only stored in the PHT when the newly determined measured power usage is medium or high. In yet another embodiment, the measured power usage stored to the PHT is incremented each time a newly determined measured power usage exceeds the presently stored measured power usage, so that the measured power usage stored in the PHT increases gradually. For example, when the presently stored measured power usage is low, the measured power usage is stored in the PHT as medium when the newly determined measured power usage is medium or high. Those skilled in the art will appreciate that the storage of the measured power usage to the PHT can be selected as desired for a particular application.

Figure 3:
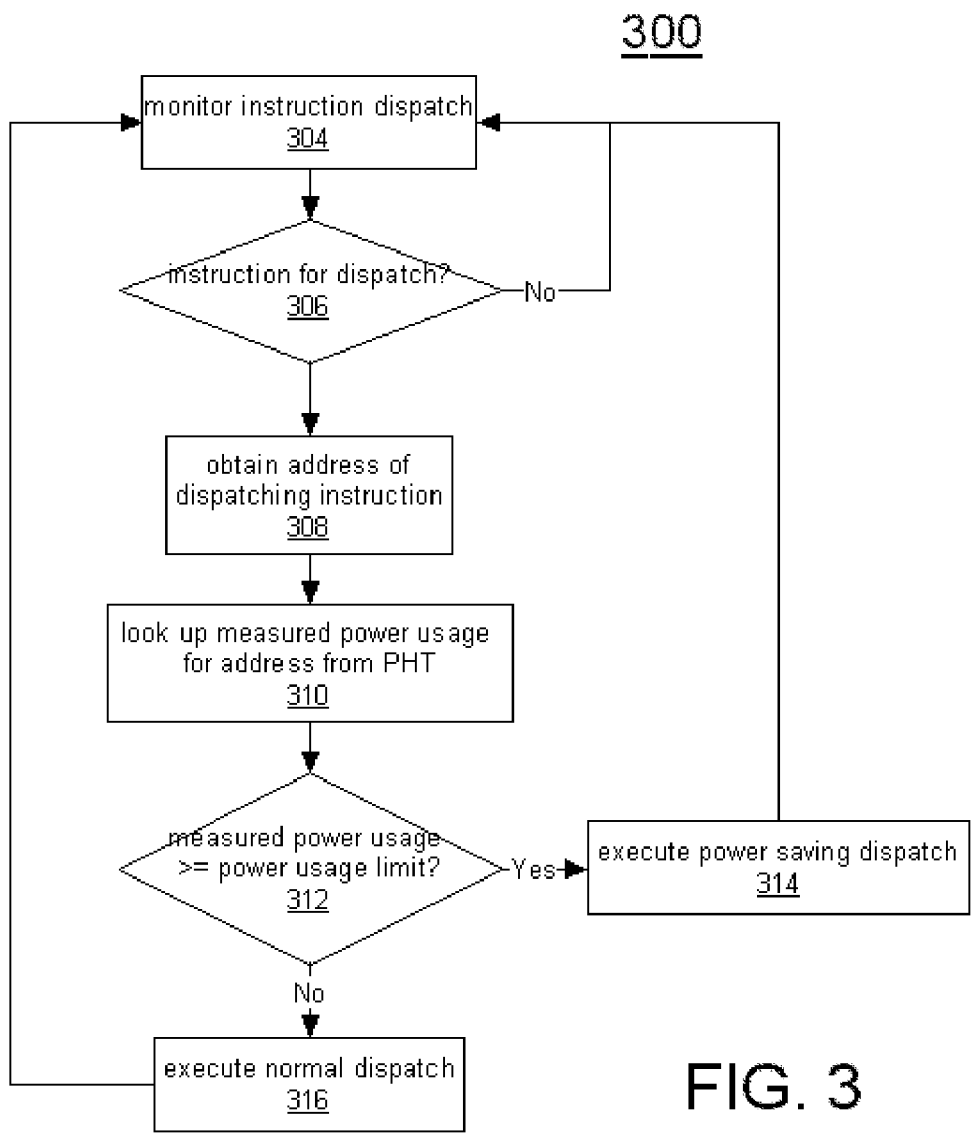
FIG. 3 is a flow chart of a method of power management using a power history table performed in accordance with the present invention.

FIG. 3 is a flow chart of a method of power management using a power history table performed in accordance with the present invention. The power history table management use method 300 uses the measured power usage values stored in the power history table (PHT) by address to manage power for the computer processor system.

The method 300 starts with monitoring dispatch of instructions for a dispatched instruction 304. It is determined whether an instruction is being dispatched 306. When no instruction is dispatching, the method 300 continues with monitoring instruction dispatch 304. When an instruction is dispatching, a dispatching instruction address is obtained for the dispatching instruction 308. Measured power usage is looked up from the PHT for the dispatching instruction address obtained for the dispatching instruction 310. It is determined whether the measured power usage for the dispatching instruction address is greater than or equal to a power usage limit 312. When the measured power usage is not greater than or equal to a power usage limit, a normal dispatch of the instruction is executed 316 and the method 300 can continue with monitoring instruction dispatch 304. When the measured power usage is greater than or equal to a power usage limit, a power saving dispatch of the instruction is executed as a power saving measure 314 and the method 300 ends 318. The method 300 can continue with monitoring instruction dispatch 304.

The power usage limit used in determining whether the measured power usage is greater than or equal to a power usage limit 312 can be a predetermined limit or an individually selected limit. The predetermined limit is fixed. For example, when the power usage limit is a predetermined limit of medium, the execution of the power saving dispatch of the instruction is executed 314 when the measured power usage is medium or high. The individually selected limit can be input by a user or adjusted under program control. In one example, the user may find that the computer processor system saves more power and meets run time requirements when the power usage limit is set to low rather than medium, so that the user sets the power usage limit to low. In another example, the computer processor system may detect that run time is too slow with the power usage limit is set to low and set the power usage limit to medium under program control.

When the measured power usage is greater than or equal to a power usage limit, a power saving dispatch of the instruction is executed as a power saving measure 314. Examples of power saving measures include sending instructions for execution at a slower rate and sending a break between instructions for execution. The execution rate of instructions can be reduced to reduce power usage by adjusting the way instructions are dispatched to the instruction execution unit. In one embodiment, the dispatch rate of the instructions or groups of instructions can be reduced to reduce the execution rate at the instruction execution unit. For groups of instructions, one instruction can be dispatched at a time, rather than dispatching the whole group at once. In another embodiment, breaks can be inserted between instructions to reduce the execution rate at the instruction execution unit. The number and/or duration of the breaks can be selected to provide the desired execution rate in light of the power management needs. More breaks can be provided when an instruction for an address has a high measured power usage.

The power saving dispatch of the instructions for power management can be tailored to account for measured power usage as stored in the PHT. For example, greater power savings can be implemented for an address with a high value of measured power usage than for an address with a medium value of measured power usage. A slower dispatch rate can be used for the high value address. The fineness of the control of the tailoring can be suited to the fineness of the measured power usage data storage, i.e., four bit measured power usage data storage providing sixteen possible measured power usage increments can provide finer control over the power savings than two bit measured power usage data storage providing four possible measured power usage increments.

Those skilled in the art will appreciate that the power usage limit and the instructions for power management can be selected based on operating goals and characteristics of the particular computer processor system. When the operating goal is to reduce peak power, one power usage limit may be optimal. When the operating goal is to reduce average power, a different power usage limit may be optimal. For example, a high power usage limit is often suited to controlling peak power and a lower power usage limit suited to controlling average power.

Figure 4:
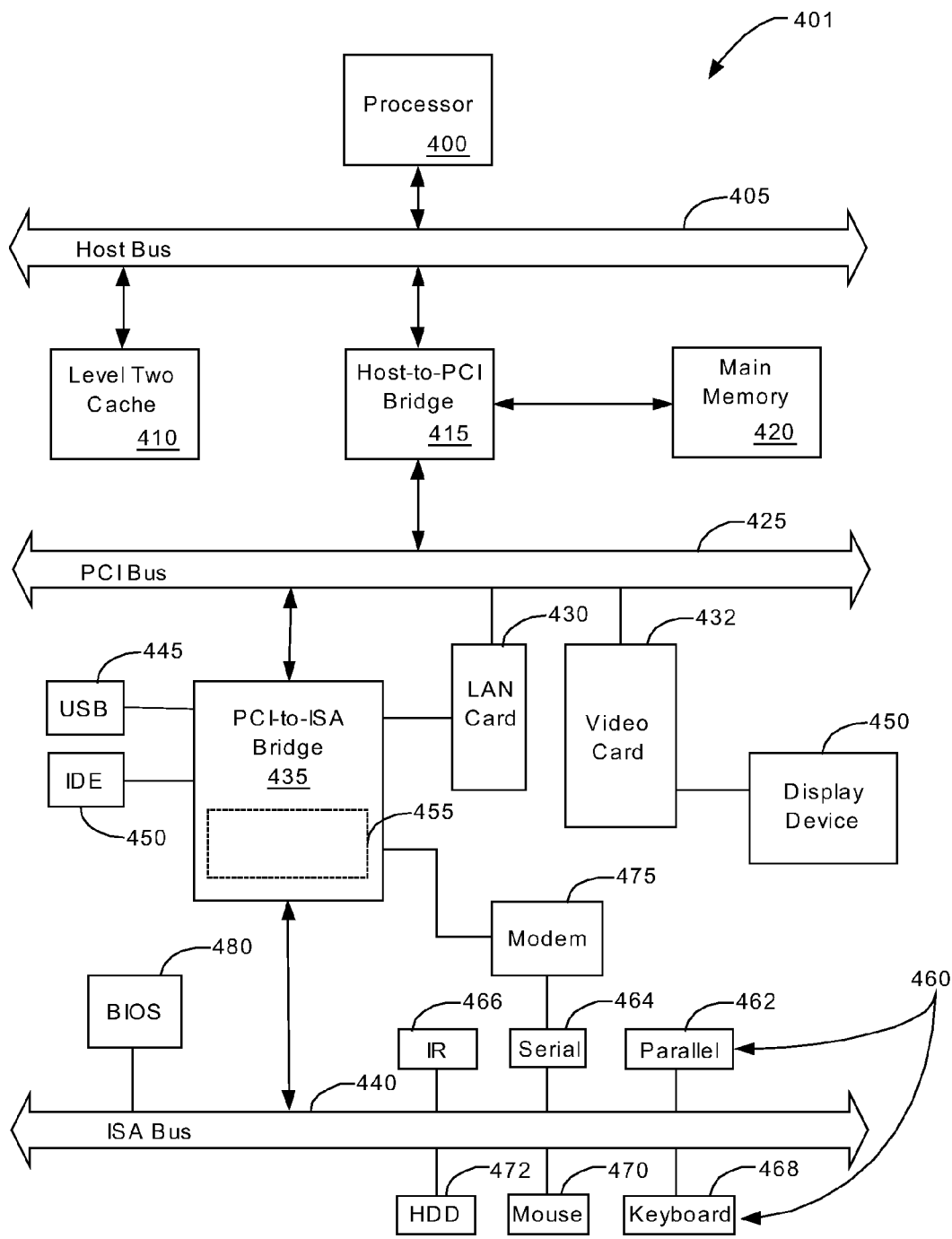
FIG. 4 is a block diagram of an information handling system for a method of power management performed in accordance with the present invention.

FIG. 4 is a block diagram of an information handling system for a method of power management performed in accordance with the present invention. The information handling system 401 is a simplified example of a computer system capable of performing the operations described herein. The information handling system 401 includes processor 400 which is coupled to host bus 405. A level two (L2) cache memory 410 is also coupled to the host bus 405. Host-to-PCI bridge 415 is coupled to main memory 420, includes cache memory and main memory control functions, and provides bus control to handle transfers among PCI bus 425, processor 400, L2 cache 410, main memory 420, and host bus 405. The PCI bus 425 provides an interface for a variety of devices including, for example, LAN card 430 and/or video card 432. The video card 432 is operably connected to a display device 490, such as a liquid crystal display (LCD), a cathode ray tube (CRT) display, a projection display, or the like. Those skilled in the art will appreciate that the video card 432 can be attached to other types of busses, such as an AGP or a PCI Express bus, as desired for a particular application.

PCI-to-ISA bridge 435 provides bus control to handle transfers between the PCI bus 425 and ISA bus 440, universal serial bus (USB) functionality 445, IDE device functionality 450, power management functionality 455, and can include other functional elements not shown, such as a real-time clock (RTC), DMA control, interrupt support, and system management bus support. Peripheral devices and input/output (I/O) devices can be attached to various interfaces 460 (e.g., parallel interface 462, serial interface 464, infrared (IR) interface 466, keyboard interface 468, mouse interface 470, and fixed disk (HDD) 472) coupled to ISA bus 440. Alternatively, a super I/O controller (not shown) can be attached to the ISA bus 440 to accommodate many I/O devices. Those skilled in the art will appreciate that particular I/O devices can be used to measure power usage and/or adjust instruction dispatch for the computer processor system in which the method of power management is being employed.

BIOS 480 is coupled to ISA bus 440, and incorporates the necessary processor executable code for a variety of low-level system functions and system boot functions. The BIOS 480 can be stored in any computer readable medium, including magnetic storage media, optical storage media, flash memory, random access memory, read only memory, and communications media conveying signals encoding the instructions (e.g., signals from a network). In order to attach information handling system 401 to another computer system to copy files over a network, LAN card 430 is coupled to PCI bus 425 and to PCI-to-ISA bridge 435. Similarly, to connect computer system 401 to an ISP to connect to the Internet using a telephone line connection, modem 475 is connected to serial port 464 and PCI-to-ISA Bridge 435.

While the computer system described in FIG. 4 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program stored on a computer readable medium and executable by a digital processing apparatus to perform operations to display data. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method of power management for a computer processor system, the method comprising:
    measuring power usage;
    monitoring execution of instructions for a finishing instruction;
    determining a finishing instruction address for the finishing instruction;
    determining a measured power usage for the finishing instruction;
    storing the finishing instruction address in association with the measured power usage in a Power History Table (PHT);
    monitoring dispatch of instructions for a dispatching instruction;
    determining a dispatching instruction address for the dispatching instruction;
    determining the measured power usage for the dispatching instruction address from the Power History Table (PHT);
    determining whether the measured rower usage for the dispatching instruction address is greater than or equal to a power usage limit; and
    executing a power saving measure when the measured power usage for the dispatching instruction address exceeds a power usage limit.

2. The method of claim 1 wherein the measuring power usage comprises:
    determining an on-time for each execution unit; and
    summing the on-times for all of the execution units.

3. The method of claim 1 wherein the measuring power usage comprises:
    determining an on-time for each execution unit; and
    summing the on-times for all of the execution units weighted by fractional area of each execution unit.

4. The method of claim 1, further comprising resetting the measured power usage stored in the Power History Table at a predetermined interval.

5. The method of claim 1 wherein the power saving measure is selected from the group consisting of sending instructions for execution at a slower rate and sending a break between instructions for execution.

6. A computer program product in a computer usable storage medium for power management for a computer processor system comprising:
    computer program code for measuring power usage;
    computer program code for monitoring execution of instructions for a finishing instruction;
    computer program code for determining a finishing instruction address for the finishing instruction;
    computer program code for determining a measured power usage for the finishing instruction;
    computer program code for storing the finishing instruction address in association with the measured power usage in a Power History Table (PHT);
    computer program code for monitoring dispatch of instructions for a dispatching instruction;
    computer program code for determining a dispatching instruction address for the dispatching instruction;
    computer program code for determining the measured power usage for the dispatching instruction address from the Power History Table (PHT);
    computer program code for determining whether the measured power usage for the dispatching instruction address is greater than or equal to a power usage limit; and
    computer program code for executing a power saving measure when the measured power usage for the dispatching instruction address exceeds a power usage limit.

7. The product of claim 6 wherein the computer program code for measuring power usage comprises:
    computer program code for determining an on-time for each clock gated region; and
    computer program code for summing the on-times for all of the clock gated regions.

8. The product of claim 6 wherein the computer program code for measuring power usage comprises:
    computer program code for determining an on-time for each clock gated region; and
    computer program code for summing the on-times for all of the clock gated regions weighted by fractional area of each clock gated region.

9. The product of claim 6, further comprising computer program code for resetting the measured power usage stored in the Power History Table at a predetermined interval.

10. The product of claim 7 wherein the power saving measure is selected from the group consisting of sending instructions for execution at a slower rate and sending a break between instructions for execution.

11. An information handling system comprising:
    a processor;
    a memory coupled to said processor to store instructions executable by a digital processing apparatus to perform operations to provide power management for a computer processor system, the operations comprising:
    measuring power usage;
    monitoring execution of instructions for a finishing instruction;
    determining a finishing instruction address for the finishing instruction;
    determining a measured power usage for the finishing instruction;
    storing the finishing instruction address in association with the measured power usage in a Power History Table (PHT);

monitoring dispatch of instructions for a dispatching instruction;

determining a dispatching instruction address for the dispatching instruction;

determining the measured power usage for the dispatching instruction address from the Power History Table (PHT);

determining whether the measured power usage for the dispatching instruction address is greater than or equal to a rower usage limit; and executing a power saving measure when the measured power usage for the dispatching instruction address exceeds a power usage limit.

12. The system of claim 11 wherein the measuring power usage comprises:

determining an on-time for each clock gated region; and summing the on-times for all of the clock gated regions.

13. The system of claim 11, the operations further comprising resetting the measured power usage stored in the Power History Table at a predetermined interval.

14. The system of claim 11 wherein the power saving measure is selected from the group consisting of sending instructions for execution at a slower rate and sending a break between instructions for execution.

15. A computer processor system with power management comprising:

an instruction fetch control unit, the instruction fetch control unit having a power history table (PHT);

an instruction dispatch control unit;

an instruction execution unit, the instruction execution unit having a power control unit; and a program state and data unit;

wherein the instruction dispatch control unit dispatches an instruction from the instruction fetch control unit to the instruction execution unit for execution, the power control unit monitors the execution of the instruction for measured power usage, and the program state and data unit monitors the execution of the instruction for a finishing instruction address, the measured power usage being stored in the power history table (PHT) in association with the finishing instruction address; and wherein the instruction dispatch control unit further dispatches a dispatching instruction from the instruction fetch control unit to the instruction execution unit for execution, the power control unit determines a dispatching instruction address for the dispatching instruction, determines the measured power usage for the dispatching instruction address from the Power History Table (PHT), determines whether the measured power usage for the dispatching instruction address is greater than or equal to a power usage limit, and executes a power saving measure when the measured power usage for the dispatching instruction address exceeds a power usage limit.

16. The system of claim 15 wherein the instruction fetch control unit has a branch history table (BHT), and the instruction fetch control unit monitors the execution of the instruction for branch history, the branch history being stored in the branch history table (BHT) in association with the finishing instruction address.

17. The system of claim 16 wherein the power history table (PHT) and the branch history table (BHT) are a single table.

* * * * *